(12) United States Patent
Revaud et al.

(10) Patent No.: US 11,176,425 B2
(45) Date of Patent: Nov. 16, 2021

(54) JOINT DETECTION AND DESCRIPTION SYSTEMS AND METHODS

(71) Applicants: NAVER CORPORATION, Gyeonggi-do (KR); NAVER LABS CORPORATION, Gyeonggi-do (KR)

(72) Inventors: Jérome Revaud, Meylan (FR); Cesar De Souza, Grenoble (FR); Martin Humenberger, Gières (FR); Philippe Weinzaepfel, Montbonnot-Saint-Martin (FR)

(73) Assignees: NAVER CORPORATION, Gyeonggi-Do (KR); NAVER LABS CORPORATION, Gyeonggi-Do (KR)

( * ) Notice: Subject to any disclaimer, the term of this patent is extended or adjusted under 35 U.S.C. 154(b) by 215 days.

(21) Appl. No.: 16/710,547

(22) Filed: Dec. 11, 2019

(65) Prior Publication Data
US 2021/0182626 A1    Jun. 17, 2021

(51) Int. Cl.
*G06K 9/62* (2006.01)
*G06N 3/04* (2006.01)
*G06K 9/00* (2006.01)

(52) U.S. Cl.
CPC ....... *G06K 9/6267* (2013.01); *G06K 9/00704* (2013.01); *G06N 3/0445* (2013.01)

(58) Field of Classification Search
CPC . G06K 9/6267; G06K 9/00704; G06N 3/0445
See application file for complete search history.

(56) References Cited

U.S. PATENT DOCUMENTS

| | | | | |
|---|---|---|---|---|
| 10,380,853 | B1* | 8/2019 | Solh | G06K 9/00362 |
| 2010/0284590 | A1* | 11/2010 | Peng | G06K 9/3233 |
| | | | | 382/128 |
| 2017/0177937 | A1* | 6/2017 | Harmsen | G06T 17/05 |
| 2019/0172224 | A1* | 6/2019 | Vajda | G06T 7/77 |
| 2020/0345292 | A1* | 11/2020 | Stavros | A61B 8/085 |
| 2020/0364876 | A1* | 11/2020 | Mohan | G06F 3/012 |

OTHER PUBLICATIONS

Dusmanu, M., Rocco, I., Pajdla, T., Pollefeys, M., Sivic, J., Torii, A., & Sattler, T. (2019). D2-net: A trainable cnn for joint detection and description of local features. arXiv preprint arXiv:1905.03561. (Year: 2019).*

(Continued)

*Primary Examiner* — Fayyaz Alam

(57) ABSTRACT

A system for detecting and describing keypoints in images is described. A camera is configured to capture an image including a plurality of pixels. A fully convolutional network is configured to jointly and concurrently: generate descriptors for each of the pixels, respectively; generate reliability scores for each of the pixels, respectively; and generate repeatability scores for each of the pixels, respectively. A scoring module is configured to generate scores for the pixels, respectively, based on the reliability scores and the repeatability scores of the pixels, respectively. A keypoint list module is configured to: select X of the pixels having the X highest scores, where X is an integer greater than 1; and generate a keypoint list including: locations of the selected X pixels; and the descriptors of the selected X pixels.

26 Claims, 8 Drawing Sheets
(3 of 8 Drawing Sheet(s) Filed in Color)

(56) References Cited

OTHER PUBLICATIONS

Revaud, Jerome, et al., "R2D2: Repeatable and Reliable Detector and Descriptor"; Naver Labs Europe, arXiv:1906.06195v2; Jun. 17, 2019.
A. B. Laguna, E. Riba, D. Ponsa, and K. Mikolajczyk. Key. net: Keypoint detection by handcrafted and learned cnn filters. arXiv preprint arXiv:1904.00889, 2019. 2.
A. Gordo, J. Almazán, J. Revaud, and D. Larlus. Deep image retrieval: Learning global representations for image search. In ECCV, 2016. 1, 2.
A. Mishchuk, D. Mishkin, F. Radenovic, and J. Matas. Working hard to know your neighbor's margins: Local descriptor learning loss. In NIPS, 2017. 1, 2, 3.2, 4.4.
B. Kumar, G. Carneiro, I. Reid, et al. Learning local image descriptors with deep siamese and triplet convolutional networks by minimising global loss functions. In CVPR, 2016. 3.2.
C. B. Choy, J. Gwak, S. Savarese, and M. Chandraker. Universal correspondence network. In NIPS, 2016. 3.2.
C. G. Harris, M. Stephens, et al. A combined corner and edge detector. In Alvey vision conference, 1988. 1.
D. DeTone, T. Malisiewicz, and A. Rabinovich. Superpoint: Self-supervised interest point detection and description. In CVPR, 2018. 1, 2, 3.1, 4.1, 4.4, 4.5, 4.5.
D. G. Lowe. Distinctive image features from scale-invariant keypoints. IJCV, 2004. 1, 4.4, 4.4, 4.5, 4.5.
D. Mishkin, F. Radenovic, and J. Matas. Repeatability is not enough: Learning affine regions via discriminability. In ECCV, 2018. 2, 4.4, 4.5, 4.5.
D. Novotny, S. Albanie, D. Larlus, and A. Vedaldi. Selfsupervised learning of geometrically stable features through probabilistic introspection. In CVPR, 2018. 3.2.
E. Rosten and T. Drummond. Fusing points and lines for high performance tracking. In ICCV, 2005. 2.
E. Rublee, V. Rabaud, K. Konolige, and G. R. Bradski. Orb: An efficient alternative to sift or surf. In ICCV, 2011. 1.
E. Salahat and M. Qasaimeh. Recent advances in features extraction and description algorithms: A comprehensive survey. In ICIT, 2017. 2.
E. Simo-Serra, E. Trulls, L. Ferraz, I. Kokkinos, P. Fua, and F. Moreno-Noguer. Discriminative learning of deep convolutional feature point descriptors. In ICCV, 2015. 2.
E. Ustinova and V. Lempitsky. Learning deep embeddings with histogram loss. In NIPS, 2016. 3.2.
F. Radenović, A. Iscen, G. Tolias, Y. Avrithis, and O. Chum. Revisiting oxford and paris: Large-scale image retrieval benchmarking. In CVPR, 2018. 3.3.
F. Radenović, G. Tolias, and O. Chum. CNN image retrieval learns from BoW: Unsupervised fine-tuning with hard examples. In ECCV, 2016. 1, 2.
F. Schroff, D. Kalenichenko, and J. Philbin. FaceNet: A unified embedding for face recognition and clustering. In CVPR, 2015. 1, 2.
G. Csurka, C. Dance, L. Fan, J. Willamowski, and C. Bray. Visual categorization with bags of keypoints. In Workshop on statistical learning in computer vision, ECCV, 2004. 1.
G. Csurka, C. R. Dance, and M. Humenberger. From handcrafted to deep local invariant features. arXiv preprint arXiv:1807.10254, 2018. 2.
H. Bay, T. Tuytelaars, and L. Van Gool. Surf: Speeded up robust features. In ECCV, 2006. 1.
H. Noh, A. Araujo, J. Sim, T. Weyand, and B. Han. Largescale image retrieval with attentive deep local features. In CVPR, 2017. 1, 2, 2, 4.4, 4.5.
H. Taira, M. Okutomi, T. Sattler, M. Cimpoi, M. Pollefeys, J. Sivic, T. Pajdla, and A. Torii. Inloc: Indoor visual localization with dense matching and view synthesis. In CVPR, 2018. 2.
J. Heinly, J. L. Schonberger, E. Dunn, and J.-M. Frahm. Reconstructing the world* in six days*(as captured by the yahoo 100 million image dataset). In CVPR, 2015. 1.
J. L. Schönberger and J.-M. Frahm. Structure-from-motion revisited. In CVPR, 2016. 1, 3.3, 4.5.
J. Matas, O. Chum, M. Urban, and T. Pajdla. Robust widebaseline stereo from maximally stable extremal regions. Image and vision computing, 2004. 1.
J. Nath Kundu, R. MV, A. Ganeshan, and R. Venkatesh Babu. Object pose estimation from monocular image using multiview keypoint correspondence. In ECCV, 2018. 1.
J. Revaud, P. Weinzaepfel, Z. Harchaoui, and C. Schmid. Deepmatching: Hierarchical deformable dense matching. IJCV, 2016. 3.3.
J. Revaud, P. Weinzaepfel, Z. Harchaoui, and C. Schmid. Epicflow: Edge-preserving interpolation of correspondnces for optical flow. In CVPR, 2015. 3.3.
K. Grauman and B. Leibe. Visual object recognition. Synthesis lectures on artificial intelligence and machine learning, 2011. 3.2.
K. He, F. Cakir, S. A. Bargal, and S. Sclaroff. Hashing as tie-aware learning to rank. In CVPR, 2018. 3.2.
K. He, Y. Lu, and S. Sclaroff. Local descriptors optimized for average precision. In CVPR, 2018. 1, 3.2, 3.2.
K. M. Yi, E. Trulls, V. Lepetit, and P. Fua. Lift: Learned invariant feature transform. In ECCV, 2016. 1, 2, 3.1, 4.1.
K. Mikolajczyk and C. Schmid. Scale & affine invariant interest point detectors. IJCV, 2004. 1, 4.1.
K. Mikolajczyk, T. Tuytelaars, C. Schmid, A. Zisserman, J. Matas, F. Schaffalitzky, T. Kadir, and L. Van Gool. A comparison of affine region detectors. IJCV, 2005. 1, 4.4.
K. Simonyan, A. Vedaldi, and A. Zisserman. Learning local feature descriptors using convex optimisation. IEEE Trans. on PAMI, 2014. 2.
L. Svärm, O. Enqvist, F. Kahl, and M. Oskarsson. City-scale localization for cameras with known vertical direction. IEEE Trans. on PAMI, 2016. 1, 4.5.
L. Zhang and S. Rusinkiewicz. Learning to detect features in texture images. In CVPR, 2018. 2.
M. Calonder, V. Lepetit, C. Strecha, and P. Fua. Brief: Binary robust independent elementary features. In ECCV, 2010. 1.
M. Dusmanu, I. Rocco, T. Pajdla, M. Pollefeys, J. Sivic, A. Torii, and T. Sattler. D2-net: A trainable cnn for joint detection and description of local features. In CVPR, 2019. 1, 2, 4.1, 4.4, 4.5, 4.5.
M. E. Fathy, Q.-H. Tran, M. Zeeshan Zia, P. Vernaza, and M. Chandraker. Hierarchical metric learning and matching for 2d and 3d geometric correspondences. In ECCV, 2018. 2.
M. Perd'och, O. Chum, and J. Matas. Efficient representation of local geometry for large scale object retrieval. In CVPR, 2009. 4.4.
M. Zieba, P. Semberecki, T. El-Gaaly, and T. Trzcinski. Bingan: Learning compact binary descriptors with a regularized gan. In NIPS, 2018. 1.
N. Savinov, A. Seki, L. Ladicky, T. Sattler, and M. Pollefeys. Quad-networks: unsupervised learning to rank for interest point detection. In CVPR, 2017. 1, 2, 4.4, 2.
N. Savinov, L. Ladicky, and M. Pollefeys. Matching neural paths: transfer from recognition to correspondence search. In NIPS, 2017. 2.
P. Di Febbo, C. Dal Mutto, K. Tieu, and S. Mattoccia. Kcnn: Extremely-efficient hardware keypoint detection with a compact convolutional neural network. In CVPR, 2018. 2.
S. Gauglitz, T. Höllerer, and M. Turk. Evaluation of interest point detectors and feature descriptors for visual tracking. IJCV, 2011. 2.
S. Leutenegger, M. Chli, and R. Siegwart. Brisk: Binary robust invariant scalable keypoints. In ICCV, 2011. 1.
T. Sattler, A. Torii, J. Sivic, M. Pollefeys, H. Taira, M. Okutomi, and T. Pajdla. Are large-scale 3d models really necessary for accurate visual localization? In CVPR, 2017. 1, 4.5.
T. Sattler, T. Weyand, B. Leibe, and L. Kobbelt. Image Retrieval for Image-Based Localization Revisited. In BMCV, 2012. 3.3, 4.5.
T. Sattler, W. Maddern, C. Toft, A. Torii, L. Hammarstrand, E. Stenborg, D. Safari, M. Okutomi, M. Pollefeys, J. Sivic, F. Kahl, and T. Pajdla. Benchmarking 6DOF Outdoor Visual Localization in Changing Conditions. In CVPR, 2018. 3.3, 4.5.
T. Trzcinski, M. Christoudias, V. Lepetit, and P. Fua. Learning image descriptors with the boosting-trick. In NIPS, 2012. 1.

(56) References Cited

OTHER PUBLICATIONS

T. Tuytelaars, K. Mikolajczyk, et al. Local invariant feature detectors: a survey. Foundations and trends R in computer graphics and vision, 20008. 2.
V. Balntas, E. Johns, L. Tang, and K. Mikolajczyk. Pn-net: Conjoined triple deep network for learning local image descriptors. arXiv preprint arXiv:1601.05030, 2016. 2.
V. Balntas, E. Riba, D. Ponsa, and K. Mikolajczyk. Learning local feature descriptors with triplets and shallow convolutional neural networks. In BMVC, 2016. 2, 3.2.
V. Balntas, K. Lenc, A. Vedaldi, and K. Mikolajczyk. Hpatches: A benchmark and evaluation of handcrafted and learned local descriptors. In CVPR, 2017. 4.1.
X. Han, T. Leung, Y. Jia, R. Sukthankar, and A. C. Berg. Matchnet: Unifying feature and metric learning for patchbased matching. In CVPR, 2015. 1, 2.
X. Zhang, F. X. Yu, S. Kumar, and S.-F. Chang. Learning spread-out local feature descriptors. In ICCV, 2017. 3.2.
Y. Li, M.-Y. Liu, X. Li, M.-H. Yang, and J. Kautz. A closedform solution to photorealistic image stylization. In ECCV, 2018. 4.5.
Y. Ono, E. Trulls, P. Fua, and K. M. Yi. Lf-net: learning local features from images. In NIPS, 2018. 1, 2, 3.3, 4.4, 4.4.
Y. Tian, B. Fan, and F. Wu. L2-net: Deep learning of discriminative patch descriptor in euclidean space. In CVPR, 2017. 1, 2, 3, 3.2, 3.2.

* cited by examiner

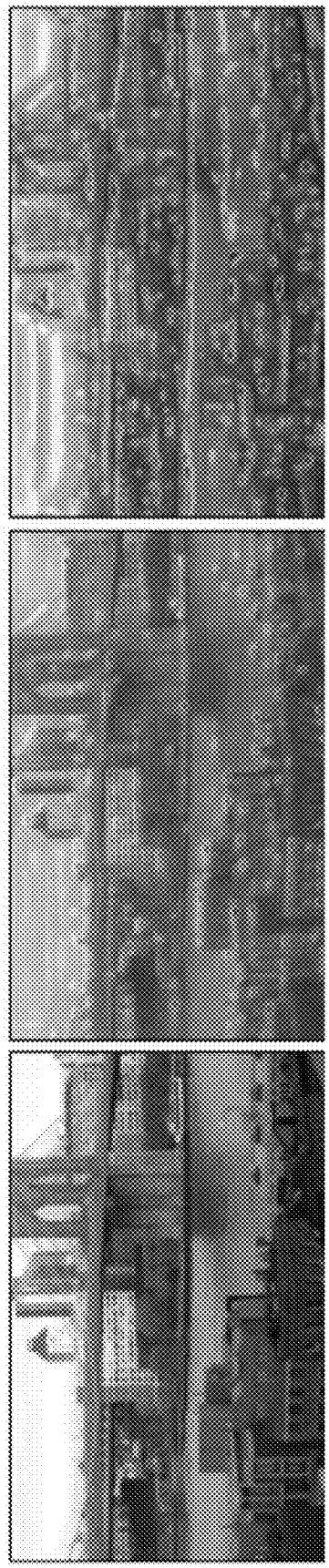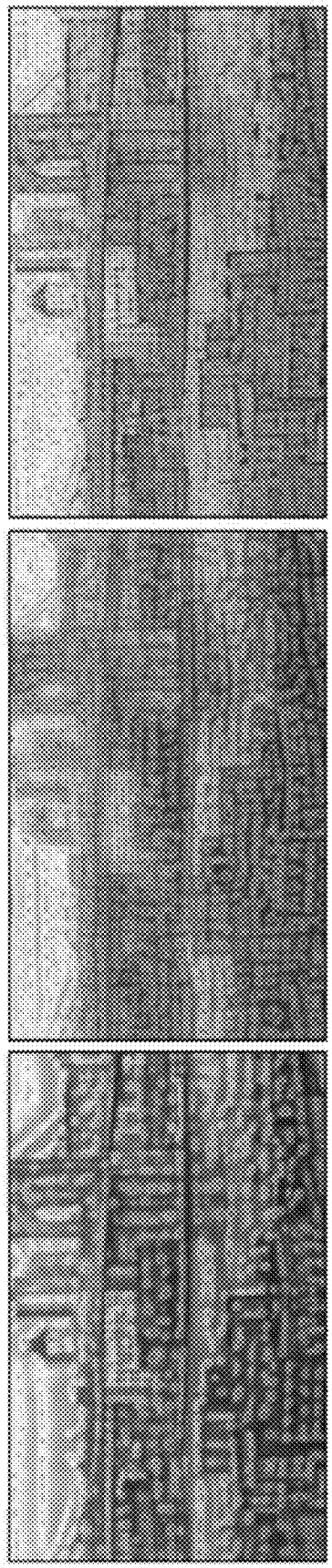
FIG. 5

JOINT DETECTION AND DESCRIPTION SYSTEMS AND METHODS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates to imaging systems and methods and more particularly to systems and methods for jointly detecting keypoints in images and generating descriptions of the keypoints.

COMPUTER PROGRAM LISTING APPENDIX

The entire contents of 1 (one) computer program listing appendix electronically submitted with this application—R2D2.txt, 111,688 bytes, created 20 Nov. 2019—are hereby incorporated by reference.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Point of interest detection and feature description are used in computer vision. A detect then describe approach may be used to detect points of interest in images and, once detected, describe the points of interest. In this manner, the points of interest are first detected. Second, the points of interest are described.

SUMMARY

In a feature, a system for detecting and describing keypoints in images is described. A camera is configured to capture an image including a plurality of pixels. A fully convolutional network is configured to jointly and concurrently: generate descriptors for each of the pixels, respectively; generate reliability scores for each of the pixels, respectively; and generate repeatability scores for each of the pixels, respectively. A scoring module is configured to generate scores for the pixels, respectively, based on the reliability scores and the repeatability scores of the pixels, respectively. A keypoint list module is configured to: select X of the pixels having the X highest scores, where X is an integer greater than 1; and generate a keypoint list including: locations of the selected X pixels; and the descriptors of the selected X pixels.

In further features, the scoring module sets the score for one of the pixels equal to the one of the reliability scores for the one of the pixels multiplied by the repeatability scores for the one of the pixels.

In further features, the fully convolutional network is configured to limit the reliability scores and the repeatability scores to between 0 and 1, inclusive.

In further features, X is an integer greater than or equal to 1,000.

In further features, the fully convolutional network includes: a first convolutional layer configured to receive the image and generate a first output based on the image; a second convolutional layer configured to receive the first output and generate a second output based on the first output; a third convolutional layer configured to receive the second output and generate a third output based on the second output; a fourth convolutional layer configured to receive the third output and generate a fourth output based on the third output; a fifth convolutional layer configured to receive the fourth output and generate a fifth output based on the fourth output; a sixth convolutional layer configured to receive the fifth output and generate a sixth output based on the fifth output; a seventh convolutional layer configured to receive the sixth output and, based on the sixth output, generate a seventh output and an eighth output, where the fully convolutional network is configured to: based on the seventh output, generate the descriptors for each of the pixels, respectively; based on the eighth output, generate the reliability scores for each of the pixels, respectively; and based on the eighth output, generate the repeatability scores for each of the pixels, respectively.

In further features, the first convolutional layer includes a 3×3 convolutional layer.

In further features, the second convolutional layer includes a 3×3 convolutional layer with at least one dilation layer.

In further features, the third convolutional layer 2 includes a 3×3 convolutional layer.

In further features, the fourth convolutional layer includes a 3×3 convolutional layer with at least one dilation layer.

In further features, the fifth convolutional layer includes a 2×2 convolutional layer.

In further features, the sixth convolutional layer includes a 2×2 convolutional layer.

In further features, the seventh convolutional layer includes a 2×2 convolutional layer.

In further features, a normalization module is configured to receive the seventh output and normalize the seventh output to produce a ninth output.

In further features, the normalization module is configured to normalize the seventh output using l2 normalization (L2-Norm).

In further features, a descriptor module is configured to, based on the ninth output, generate the descriptors for each of the pixels, respectively, where each descriptor of a pixel includes a mathematical representation of a keypoint within that pixel.

In further features: a squaring module is configured to elementwise square the eighth output to produce a tenth output; an eighth convolutional layer configured to receive the tenth output and, based on the tenth output, generate eleventh and twelfth outputs; a ninth convolutional layer configured to receive the eleventh output and generate a thirteenth output based on the eleventh output; a tenth convolutional layer configured to generate the reliability scores based on the thirteenth output; an eleventh convolutional layer configured to receive the twelfth output and generate a fourteenth output based on the twelfth output; and a twelfth convolutional layer configured to generate the repeatability scores based on the fourteenth output.

In further features, the eighth convolutional layer includes a 3×3 convolutional layer.

In further features, the eighth convolutional layer further includes at least one dilation layer.

In further features, the ninth convolutional layer includes one of a 1×1 convolutional layer and a 3×3 convolutional layer, or another suitable type of layer.

In further features, the tenth convolutional layer includes one of a 1×1 convolutional layer and a 3×3 convolutional layer.

In further features, the eleventh convolutional layer includes one of a 1×1 convolutional layer and a 3×3 convolutional layer.

In further features, the twelfth convolutional layer includes one of a 1×1 convolutional layer and a 3×3 convolutional layer.

In further features, a training module is configured to train the fully convolutional network by maximizing an Average Precision (AP) using a training dataset.

In a feature, a method for detecting and describing keypoints in images includes: receiving an image including a plurality of pixels; and jointly and concurrently: generating descriptors for each of the pixels, respectively; generating reliability scores for each of the pixels, respectively; and generating repeatability scores for each of the pixels, respectively; generating scores for the pixels, respectively, based on the reliability scores and the repeatability scores of the pixels, respectively; selecting X of the pixels having the X highest scores, where X is an integer greater than 1; and generating a keypoint list including: locations of the selected X pixels; and the descriptors of the selected X pixels.

In further features, the method further includes identifying an object in the image based on the locations and the descriptors.

In a feature, a system for detecting and describing keypoints in images includes: a means for receiving an image including a plurality of pixels and jointly and concurrently: generating descriptors for each of the pixels, respectively; generating reliability scores for each of the pixels, respectively; and generating repeatability scores for each of the pixels, respectively; a means for generating scores for the pixels, respectively, based on the reliability scores and the repeatability scores of the pixels, respectively; and a means for: selecting X of the pixels having the X highest scores, where X is an integer greater than 1; and generating a keypoint list including: locations of the selected X pixels; and the descriptors of the selected X pixels.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein:

FIG. 5 includes an example input image and various repeatability mappings S generated based on the input image using different patch sizes;

In the drawings, reference numbers may be reused to identify similar and/or identical elements.

DETAILED DESCRIPTION

A detect then describe approach may be used to detect features in images and describe the detected features. First, an image is scanned pixel by pixel to determine whether each pixel represents a keypoint. If a pixel represents a keypoint, a neighborhood of predetermined dimensions is defined around the pixel (e.g., with the pixel at the center of the neighborhood). A description of the neighborhood is then generated. In this manner, keypoints in an image are detected first, and described second. A keypoint together with its description may be referred to as a feature. A combination of keypoints of an image can be used to detect an object present in the image.

The present application involves jointly (and concurrently) detecting and describing features in images. A description and detection module jointly and concurrently generates: descriptors for each pixel; reliability scores for each pixel; and repeatability scores for each pixel. The reliability scores and repeatability scores represent reliability and repeatability mappings, respectively.

The reliability scores and repeatability scores are used together to generate overall scores for each pixel. The Y pixels with the Y highest overall scores are retained and included in a keypoint list for the image representative of the locations and descriptions of the Y most reliable and repeatable keypoints within the image.

Figure 1:
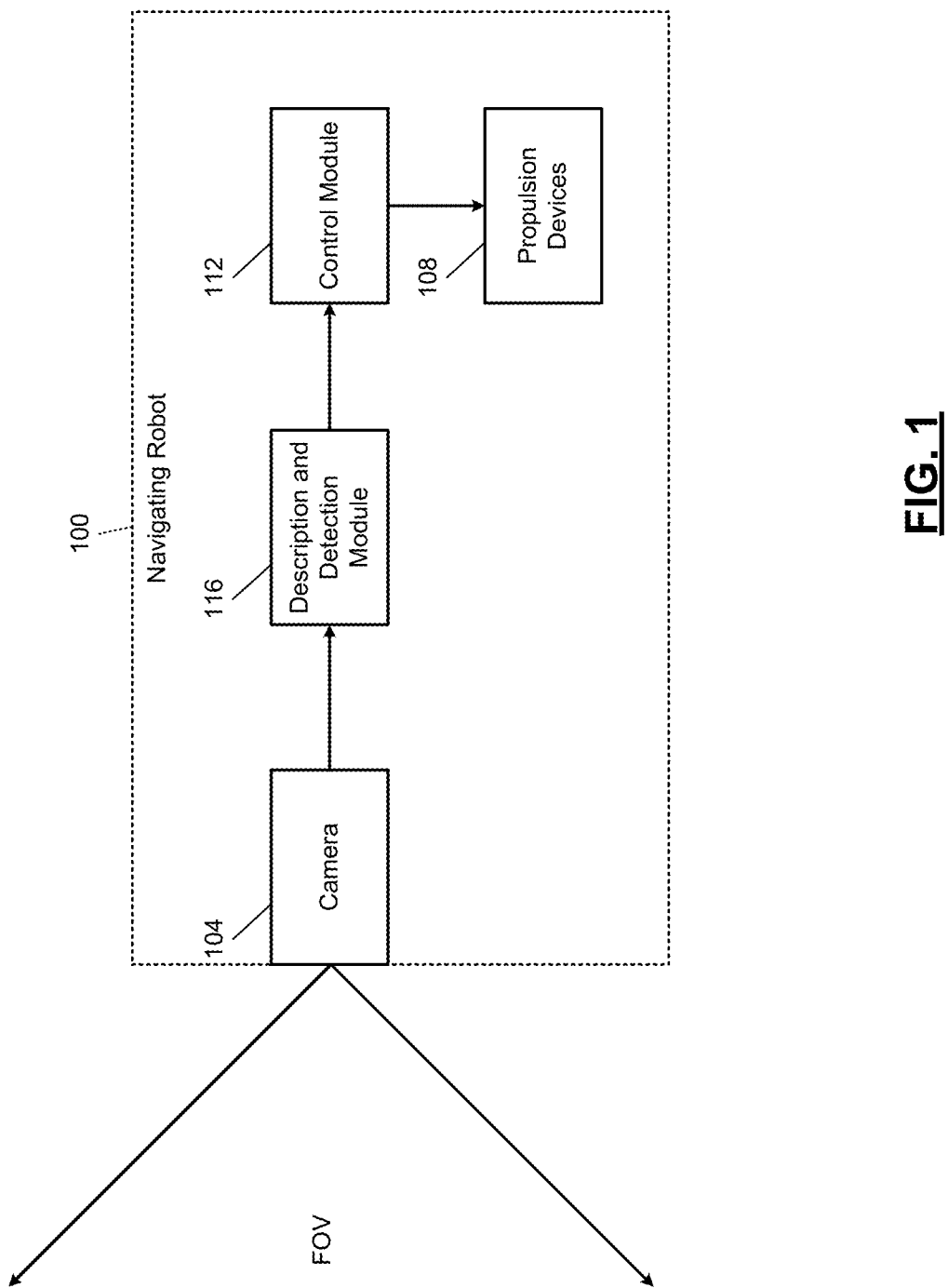
FIG. 1 is a functional block diagram of an example implementation of a navigating robot.

FIG. 1 is a functional block diagram of an example implementation of a navigating robot 100. The navigating robot 100 includes a camera 104 that captures images within a predetermined field of view (FOV) in front of the navigating robot 100. The predetermined FOV may be less than or equal to 360 degrees around the navigating robot 100. The navigating robot 100 may therefore have less than or equal to a full 360 degree FOV around the navigating robot 100. In various implementations, more than one camera may be used to capture the full 360 FOV or a greater FOV than a single camera. The operating environment of the navigating robot 100 may be an indoor space, i.e., within a building, parking garage, cave or other enclosure, an outdoor space, or a combination of indoor and outdoor spaces.

The camera 104 may be, for example, a grayscale camera, a grayscale-D camera, a red, green, blue (RGB) camera, an RGB-D camera, or another suitable type of camera. A grayscale-D camera includes a depth (D) component. An RGB-D camera also includes a depth (D) component. In various implementations, the navigating robot 100 may include only the (one) camera 104 and not include any other visual imaging cameras and/or sensors.

The navigating robot 100 includes one or more propulsion devices 108, such as one or more wheels, one or more treads, one or more moving legs, and/or one or more other types of devices configured to propel the navigating robot 100 forward, right, left, up, and/or down. A combination of two or more of the propulsion devices 108 may be used to propel the navigating robot 100 forward, to turn the navigating robot 100 right, to turn the navigating robot 100 left, and/or to elevate the navigating robot 100 vertically up or down.

The navigating robot 100 includes a control module 112 that is configured to control the propulsion devices 108 to navigate the operating environment without colliding with any objects based on input from the camera 104. The control module 112 determines how to propel the navigating robot 100 via the propulsion devices 108 based on a list of keypoints and locations generated by a description and detection module 116. For example, the control module 112 may identify one or more objects based on the keypoints and control the propulsion devices 108 to move the navigating robot 100 toward an object, away from object, etc. The control module 112 may identify objects based on the keypoints, for example, using an object detection algorithm. As another example, the control module 112 may determine a location of the navigating robot 100 in the operating environment based on the keypoints and control the propulsion devices 108 to move the navigating robot 100 toward a target location, etc.

The description and detection module 116 generates the list of keypoints by jointly (and concurrently) detecting and describing keypoints in images captured by the camera 104. The joint detection and description of keypoints is discussed further below. While the example of use of the list of keypoints in visual navigation is provided, the present application is also applicable to other uses of the list of keypoints, such as point of interest detection, etc.

The camera 104 may capture images at a predetermined frequency, such as 60 hertz (Hz), 120 Hz, or another suitable frequency. The description and detection module 116 may generate a list of keypoints and locations each time or each n times the camera 104 outputs an image, where n is an integer greater than 1.

The control module 112 may be configured to set a state at a given time to one of a group consisting of: a first state (corresponding to moving forward by a predetermined distance, such as 1 foot or ⅓ of a meter), a second state (corresponding to turning right by a predetermined angle, such as 45 or 90 degrees), a third state (corresponding to turning left by a predetermined angle, such as 45 or 90 degrees), a fourth state (corresponding to not moving), a fifth state (corresponding to vertically raising by a first predetermined amount), or a sixth state (corresponding to vertically lowering by a second predetermined amount).

The control module 112 is configured to control the propulsion devices 108 based on the state. For example, the control module 112 may actuate the propulsion devices 108 to move the navigating robot 100 forward by the predetermined distance in response to the state being in the first state. The control module 112 may actuate the propulsion devices 108 to turn the navigating robot 100 to the right by the predetermined angle in response to the state being in the second state. The control module 112 may actuate the propulsion devices 108 to turn the navigating robot 100 to the left by the predetermined angle in response to the state being in the third state. The control module 112 may not actuate the propulsion devices 108 to not move the navigating robot 100 in response to the state being in the fourth state. The control module 112 may actuate the propulsion devices 108 to vertically raise the navigating robot 100 by the first predetermined amount in response to the state being in the fifth state. The control module 112 may actuate the propulsion devices 108 to vertically lower the navigating robot 100 by the second predetermined amount in response to the state being in the sixth state.

Figure 2:
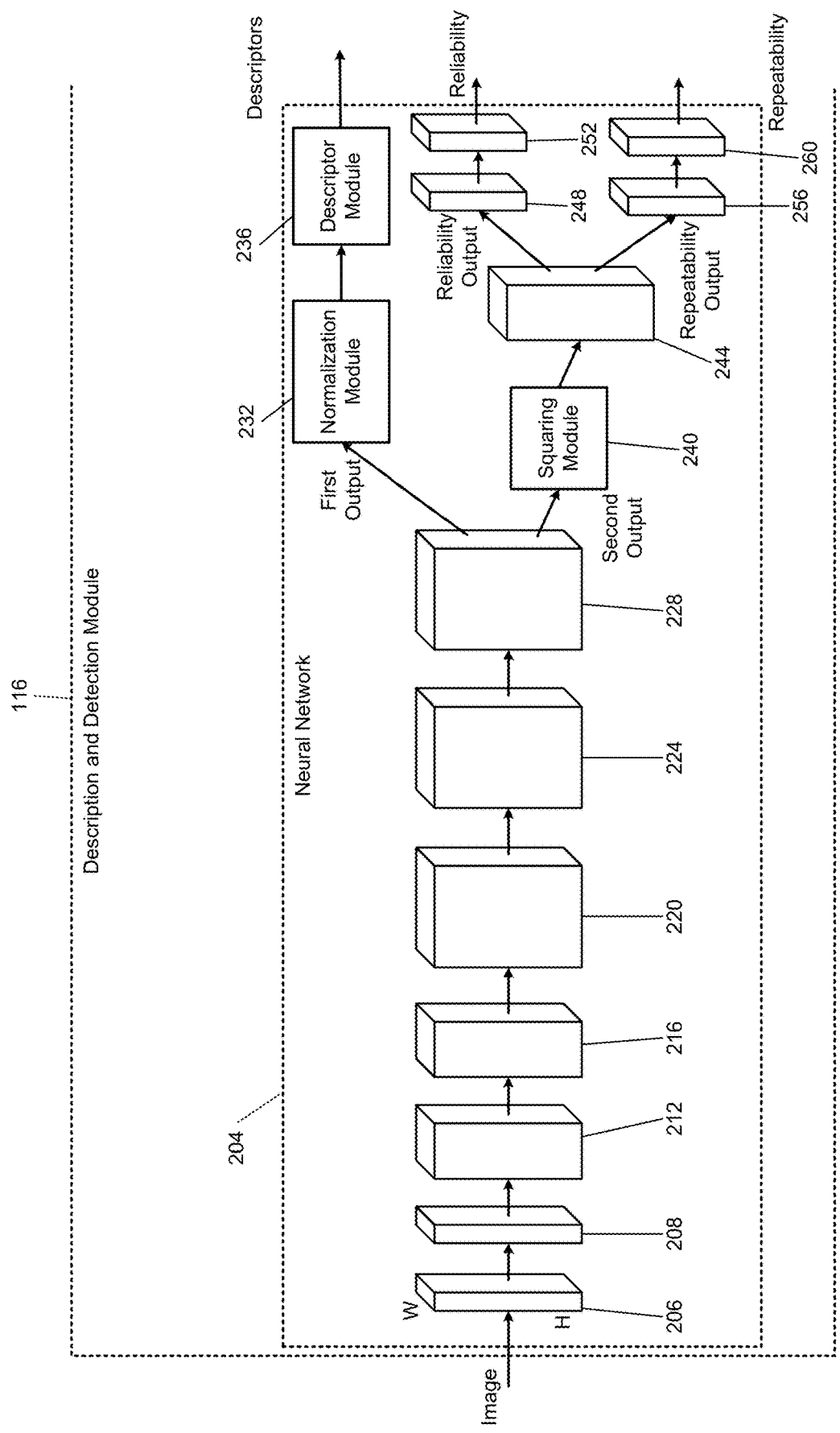
FIGS. 2 and 3 are a functional block diagram of an example implementation of a description and detection module.
Figure 3:
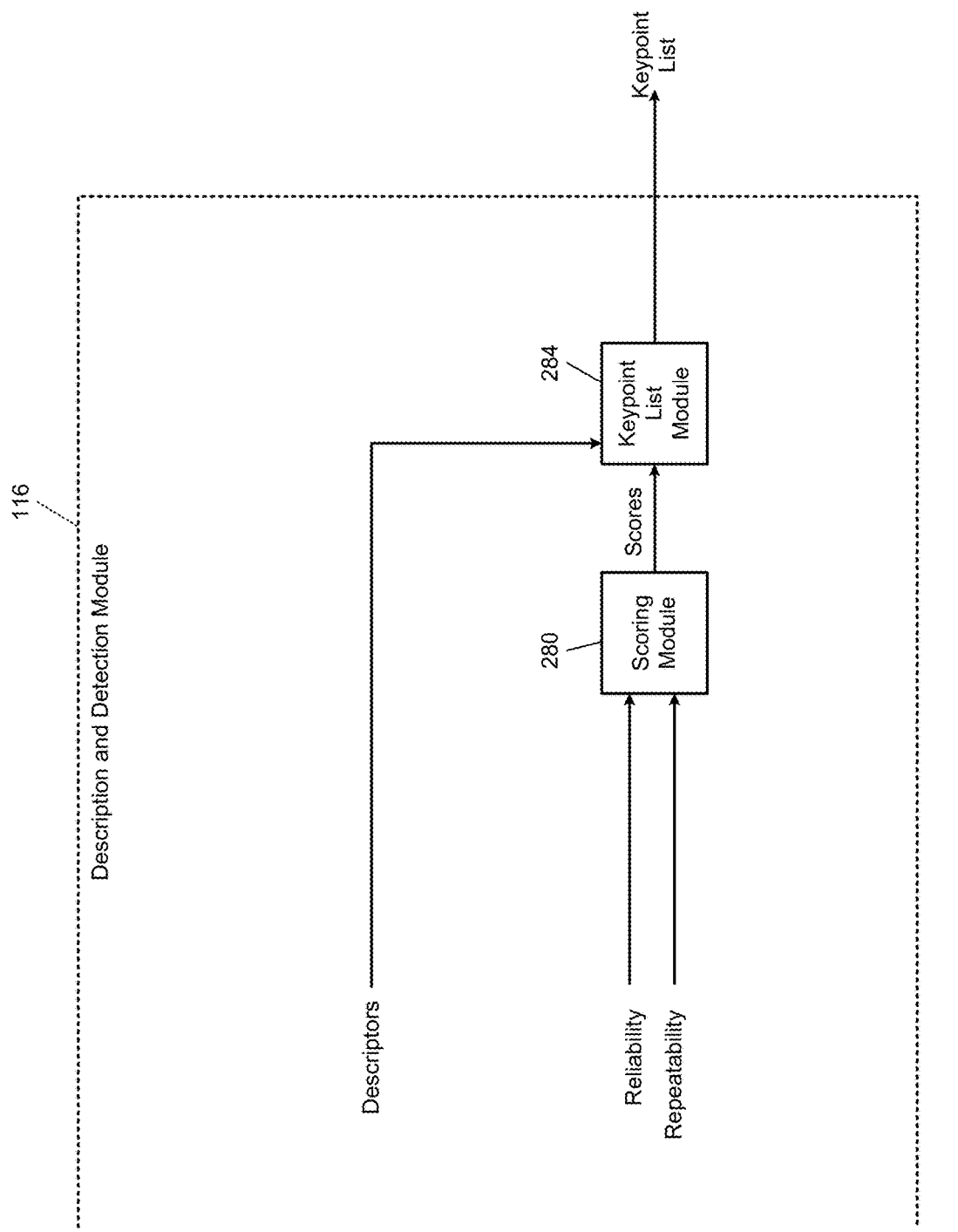

FIGS. 2 and 3 are together a functional block diagram of an example implementation of the description and detection module 116. A neural network 204 receives an image from the camera. The neural network 204 includes a fully convolutional network (FCN). The neural network 204 processes the image and, based on the image, generates a first output for generating descriptors of keypoints in the image. The neural network 204 also, based on the image, generates a second output for generating a reliability mapping for the keypoints of the image and a repeatability mapping for the keypoints of the image. The neural network 204 may include, for example, a convolutional neural network (CNN) or another suitable type of neural network. For example only, the neural network 204 may include or be based on an L2-Net neural network.

An example architecture of the neural network 204 is provided in FIG. 2. A first layer 206 may include a 3×3 convolutional layer or another suitable type of layer. Images are input to the first layer 206. A second layer 208 receives the output of the first layer 206 and may include a 3×3 convolutional layer with one or more dilation layers (e.g., 2 dilation layers) or another suitable type of layer.

A third layer 212 receives the output of the second layer 208 and may include a 3×3 convolutional layer or another suitable type of layer. A fourth layer 216 receives the output of the third layer 212 and may include a 3×3 convolutional layer with one or more dilation layers (e.g., 1 dilation layers) or another suitable type of layer. A fifth layer 220 receives the output of the fourth layer 216 and may include a 2×2 convolutional layer or another suitable type of layer. A sixth layer 224 receives the output of the fifth layer 220 and may include a 2×2 convolutional layer or another suitable type of layer. A seventh layer 228 receives the output of the sixth layer 224 and may include a 2×2 convolutional layer or another suitable type of layer.

The seventh layer 228 generates the first and second outputs. The first output is used to generate the descriptors, and the second output is used to generate the reliability and repeatability mappings. A normalization module 232 receives the first output and normalizes the first output. The normalization may be, for example, l2 normalization (L2-Norm) or another suitable type of normalization.

A descriptor module 236 generates descriptors for each pixel of the image based on the output of the normalization module 232. The descriptors include a vector representing one keypoint within the pixels, respectively. As such, the descriptor of a pixel includes a mathematical representation of a keypoint within that pixel.

The second output is provided to a squaring module 240. The squaring module 240 squares the second output. The squaring module 240 may, for example, perform element-wise squaring.

An eighth layer 244 generates a reliability output and a repeatability output based on the output of the squaring module 240. The eighth layer 244 may include a 3×3 convolutional layer or another suitable type of layer. The eighth layer 244 may also include one or more dilation layers, such as 2 dilation layers.

A ninth layer 248 receives the reliability output and may include a 1×1 convolutional layer, a 3×3 convolutional layer, or another suitable type of layer. A softmax module may apply a softmax to the output of the ninth layer 248 in various implementations before the output is provided to a tenth layer 252. The tenth layer 252 receives the output of the ninth layer 248 (with or without the softmax applied) and may include a 1×1 convolutional layer, a 3×3 convolutional layer, or another suitable type of layer. The tenth layer 252 outputs the reliability mapping. The reliability mapping includes a pixel by pixel map of reliability scores for the pixels, respectively. The reliability scores are indicative of reliability that any features detected within the pixels are accurate. The reliability scores may be, for example, values between 0 and 1, inclusive. The reliability of a pixel may increase as the reliability score of the pixel increases and vice versa.

An eleventh layer 256 receives the reliability output and may include a 1×1 convolutional layer, a 3×3 convolutional layer, or another suitable type of layer. A softmax module may apply a softmax to the output of the eleventh layer 256 in various implementations before the output is provided to a twelfth layer 260. The twelfth layer 260 receives the output of the eleventh layer 256 (with or without the softmax applied) and may include a 1×1 convolutional layer, a 3×3 convolutional layer, or another suitable type of layer. The twelfth layer 260 outputs the repeatability mapping. The repeatability mapping includes a pixel by pixel map of repeatability scores for the pixels, respectively. The repeatability scores are indicative of a likelihood that any features detected within the pixels will be detected each time the features(s) are included in a pixel. The repeatability scores may be, for example, values between 0 and 1, inclusive. The likelihood may increase as the repeatability score of the pixel increases and vice versa.

The above describes a fully convolutional network (FCN) that generates 3 outputs for an image I of size H×W. The first output (descriptor) is a three dimensional (3D) tensor $$X \in \mathbb{R}^{H \times W \times D},$$

that corresponds to a set of dense D-dimensional items. The second output (the repeatability mapping/scores, S) can be described as $$S \in [0,1]^{H \times W}$$

that provides sparse and repeatable keypoint locations. The description and detection module 116 generates one repeatability score per pixel and one descriptor per pixel. The third output (the reliability mapping/scores, R) can be described as $$R \in [0,1]^{H \times W}$$

that indicates the reliability (discriminativeness) of descriptor $X_{ij}$ at each pixel (i,j with i=1 . . . W, and j=1, . . . , H). The description and detection module 116 generates one reliability score per pixel. Relative to the L2-Net, the above reduces the number of weights used (e.g. by a factor of 5) and produces similar or better accuracy.

As shown in FIG. 3, a scoring module 280 determines scores for the pixels. The scoring module 280 determines the scores for the pixels based on the reliability scores of the pixels and the repeatability scores of the pixels, respectively. For example, the scoring module 280 determines the score for a pixel based on the reliability score for that pixel and the repeatability score of that pixel. The scoring module 280 may determine the scores using one of an equation and a lookup table that relates reliability scores and repeatability scores to scores. For example, the scoring module 280 may set the score of a pixel based on or equal to the reliability score of the pixel multiplied by the repeatability score of the pixel.

A keypoint list module 284 generates the keypoint list for the image based on the scores of the pixels, respectively. For example, the keypoint list module 284 selects the Y number of pixels having the highest Y scores, where Y is an integer greater than one. For example only, Y may be 1,000, 5,000, 10,000, or another suitable number. The keypoint list module 284 includes the pixel location (e.g., i, j) of the selected pixels and the descriptors of the selected pixels in the keypoint list for the image.

Training and Testing

Figure 4:
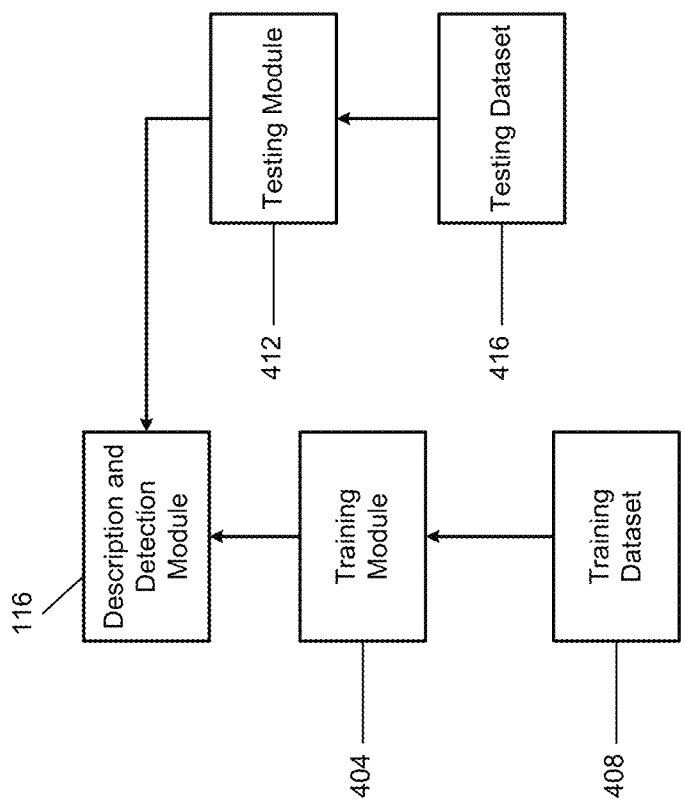
FIG. 4 is a functional block diagram of an example training and testing system.

FIG. 4 is a functional block diagram of an example training and testing system. A training module 404 trains the description and detection module 116 using data stored in a training dataset 408. Repeatability is treated as a self-supervised task, and the training module 404 trains the description and detection module 116 such that the positions of local maxima in S (the repeatability mapping) are covariant to natural image transformations, such as viewpoint or illumination changes.

Let I and I' be two images of the same scene, and let $U \in \mathbb{R}^{H \times W \times 2}$ be the ground-truth correspondences between the two images. In other words, if the pixel (i, j) in the first image I corresponds to pixel (i', j') in the second image I', then $U_{ij}$=(i', j'). The training module 404 may estimate U using an optical flow algorithm or a stereo matching algorithm if I and I' are natural images or can be obtained if the second image I' was generated synthetically with a known transformation, such as a homography.

Let S and S' be the repeatability mappings for the first and second images I and I', respectively. Let S'$_U$ be the repeatability mapping for an image I' warped according to U from an image I. The training module 404 trains the description and detection module 116 to enforce the fact that all local maxima in S correspond to the local maxima in S'$_U$.

The training module 404 maximizes the cosine similarity between S and S'$_U$. The cosine similarity is denoted as cosim in the following. When cosim(S, S'$_U$) is maximized, the two reliability mappings are identical, and their maxima correspond exactly. However, this process assumes no occlusions, warp artifacts, or border effects, which may impact performance.

The training module 404 remedies this by averaging the cosine similarity over patches that are smaller than the entire image. The set of overlapping patches can be defined as $\mathcal{P}=\{p\}$ that contains N×N patches in [1, . . . W]×[1, . . . H]. The training module 404 defines a first loss as:

$$\mathcal{L}_{cosim}(I, I', U) = 1 - \frac{1}{|\mathcal{P}|} \sum_{p \in \mathcal{P}} \mathrm{cosim}(S[p], S'_U[p])$$

where $S[p] \in \mathbb{R}^{N^2}$ is a vectorized (flattened) N×N patch p extracted from S, and likewise for $S'_U[p]$. $L_{cosim}$ can be minimized by having S and S'u constant.

To avoid that, the training module 404 uses a second loss that tries to maximize the local peakiness of the repeatability mapping. The second loss can be described as follows $$\mathcal{L}_{peaky}(I) = 1 - \frac{1}{|\mathcal{P}|} \sum_{p \in \mathcal{P}} (\max_{(i,j) \in p} S_{ij} - mean_{(i,j) \in p} S_{ij})$$

The second function allows the frequency of local maxima to be chosen by varying the patch size N. For example, FIG. 5 includes an input image and various repeatability mappings S generated based on different values of N. In FIG. 5, red denotes low values, while green denotes high values.

The examples of FIG. 5 are obtained when training the repeatability losses $\mathcal{L}_{peaky}$ and $\mathcal{L}_{rep}$ with different patch sizes N.

The training module 404 determines a repeatability loss based on the above first and second losses. The training module 404 may determine the repeatability loss using one of an equation and a lookup table that relates the first and second losses to the repeatability loss. For example, the training module 404 may set the repeatability loss based on or equal to a weighted sum of the first and second losses. An example equation for determining the repeatability loss ($\mathcal{L}_{rep}$) is as follows.

$$\mathcal{L}_{rep}(I,I',U) = L_{cosim}(I,I',U) + \lambda(\mathcal{L}_{peaky}(I) + \mathcal{L}_{peaky}(I'))$$

To enforce reliability, the training module 404 not only computes the repeatability mapping S but jointly extracts dense local descriptors X and predicts for each descriptor $X_{ij} \in \mathbb{R}^D$ a confidence value $R_{ij} \in [0,1]$ that is an estimate of reliability (discriminativeness) of the descriptor. The training module 404 learns to choose between making descriptors as discriminative as possible with a high confidence, or a low confidence where the loss will have a low impact on the descriptor, such as for regions that cannot be made sufficiently discriminative.

The training module 404 treats descriptor matching as a ranking optimization problem as follows. Given two images I and I', the training module 404 searches each descriptor from I in I' as a query, and ranks all descriptors from I' by increasing distance. The training module 404 may use ranking losses, such as triplet losses or pairwise ranking losses. These losses perform local optimization, based on a pair, triplet, or quadruplet of training samples, which may or may not correlate well with a global metric, such as Average Precision (AP). Directly optimizing the AP for patch descriptor matching may improve performance. Use of listwise losses may define a differentiable approximation of the AP, a ranking metric, that the training module 404 can directly optimize during training. Given a batch of ground-truth pairs of image patches, the training module 404 may use a convolutional neural network to compute the descriptors. The training module 404 may compute the matrix of Euclidean distances between all patch descriptors from the batch. Each row in the matrix includes the distances between a query patch from the first image and all patches from the second image, acting as database documents. The training by the training module 404 includes maximizing the AP computed for each query q in the batch B and averaged over the whole batch.

$$\mathcal{L}_{AP} = \frac{1}{B}\sum_{q=1}^{B} \mathcal{L}_{AP}(q),$$

$$\mathcal{L}_{AP}(q) = 1 - AP(q),$$

where $\mathcal{L}_{AP}$ is an AP loss.

Each pixel (I, j) from the first image defines a patch of size M that the training module 404 compares with all other patches in the second image. Based on the ground-truth correspondence U, the training module 404 computes its AP, which is similar to the $\mathcal{L}_{AP}$. The training module 404 may extract local descriptors everywhere, but not all locations are equally interesting. Uniform regions and elongated one dimensional (1D) patterns may lack the distinctiveness for good feature matching. Even well textured regions may be unreliable from their semantic nature, such as tree leafages or ocean waves. Forcefully optimizing the patch descriptor even in meaningless regions of an image could hinder the training and runtime performance.

The present application therefore involves use of a new loss by the training module 404 to spare the network in wasting its efforts on undistinctive regions as follows:

$$\mathcal{L}_{APk}(i,j) = 1 - [AP(i,j)R_{ij} + k(1 - R_{ij})]$$

where $k \in [0,1]$ is a hyperparameter that indicates a minimum expected AP per patch. To minimize $\mathcal{L}_{APk}(i,j)$ the training module 404 predicts $R_{ij}=0$ if AP(i, j)<k and $R_{ij}=1$ conversely (if AP(i,j) is greater than or equal to k). The training module 404 sets $R_{ij}$ to between 0 and 1 and reflects the confidence of the training module 404 with respect to the reliability of patch i, j. k is a predetermined value. For example only, k may be 0.5 or another suitable value. k=0.5 has shown good results in practice.

For testing (of the training), a testing module 412 may execute multiple times on the input image at different scales starting from the original scale, and downsampling by $2^{1/4}$ each time until the image is smaller than 128 pixels. The testing module 412 may test the (trained) description and detection module 116 using images stored in a testing dataset 416. In various implementations, the testing dataset 416 may be a part of the training dataset 408 that is reserved for testing.

For each scale, the training module 404 may find local maxima in S and gather descriptors from X at corresponding locations. The training module 404 may keep a list of best K number of descriptors over all scales where the descriptor (overall) score is computed as a product $S_{ij}R_{ij}$, as described above.

For training, the training module 404 may determine the loss at all image location (pixels) as the salient regions may not be known in advance. To generate dense ground-truth matches, the training module 404 may execute: (a) using a pair of images where the second image is obtained by applying a predetermined transformation to the first image (e.g., a homographic transform, color jittering, or another suitable transformation); or (b) using a pair coming from an image sequence or a set of unordered images. In the example of using a pair of images, the training module 404 may use a pipeline based on optical flow tools that can reliably extract dense correspondences given one image pair and a few sparse structure from motion (SfM) verified correspondences. First, the training module 404 may execute a SfM pipeline that outputs a list of three dimensional (3D) points and six dimensional (6D) camera pose corresponding to each image. For each image pair with a sufficient overlap (e.g., at least a predetermined number of common 3D points), the training module 404 determines a fundamental matrix. Determining the fundamental matrix directly from the 2D SfM correspondences may be more reliable than directly using the 6D camera pose. Next, the training module 404 determines correspondences (e.g., high-quality and dense) using the edge-preserving interpolation of correspondences (EpicFlow) algorithm. The training module 404 may also add epipolar constraints in a DeepMatching algorithm. The first step of the EpicFlow algorithm produces semi-sparse matches. The training module 404 may also predict a mask where the flow is reliable. Optical flow is by definition defined everywhere, even in occluded areas. Training, however, may not be useful for occluded areas. The training module 404 may post-process the output of the DeepMatching algorithm as follows: compute a graph of connected consistent neighbors, and keep only matches belonging to large connected components (e.g., at least 50 matches). The mask is defined using a thresholded kernel density estimator on the verified matches. The training module 404 may use pairs of randomly transformed images from the distractors added recently to the Oxford and Paris retrieval datasets, which include images from the Internet. The training module 404 uses pairs extracted (e.g., using SfM) from the Aachen Day-Night dataset which includes images from the city of Aachen, Germany.

As an example, the training module 404 may sub-sample query pixels in the first image on a grid of 8×8 pixels from cropped images of resolution 192×192 pixels. In the second image, the training module 404 may consider corresponding pixels of the queries and pixels sampled on a regular grid with a step of 8 pixels. To handle the imperfection of flow and matches, the training module 404 may define the positives as the pixels within a radius of a predetermined distance (e.g., 4 pixels) from the optical flow precision, and the negatives as all pixels at more than a second predetermined distance (e.g., 8 pixels) from this position. Optimization may be performed with a batch size of 8, a learning rate of 0.001 and a weight decay of 0.0005.

The following metrics may be used to assess test results after training.

Repeatability score for a pair of images may be the number of point correspondences between two images divided by the minimum number of keypoint detections in the pair. The average score over all image pairs may be used.

Matching score (M-Score) may be the average ratio between the ground-truth correspondences that can be recovered by the whole pipeline and the total number of estimated features within the shared viewpoint region when matching points from the first image to the second image and the second image to the first image.

Mean matching accuracy (MMA) may be the average percentage of correct matches in an image pair considering multiple pixel error thresholds. The average for each threshold over all image pairs may be used.

The patch size N on the repeatability loss $\mathcal{L}_{rep}$ dictates the number of keypoints as the repeatability loss encourages the outputting of a single local maxima per window of size N×N. When N is large, a few highly repeatable keypoints may be detected. When N is small, the number of keypoints increases, but the repeatability decreases. Even empty regions (e.g., sky) may be detected when N is small, but may be avoided when N is large.

Figure 6:
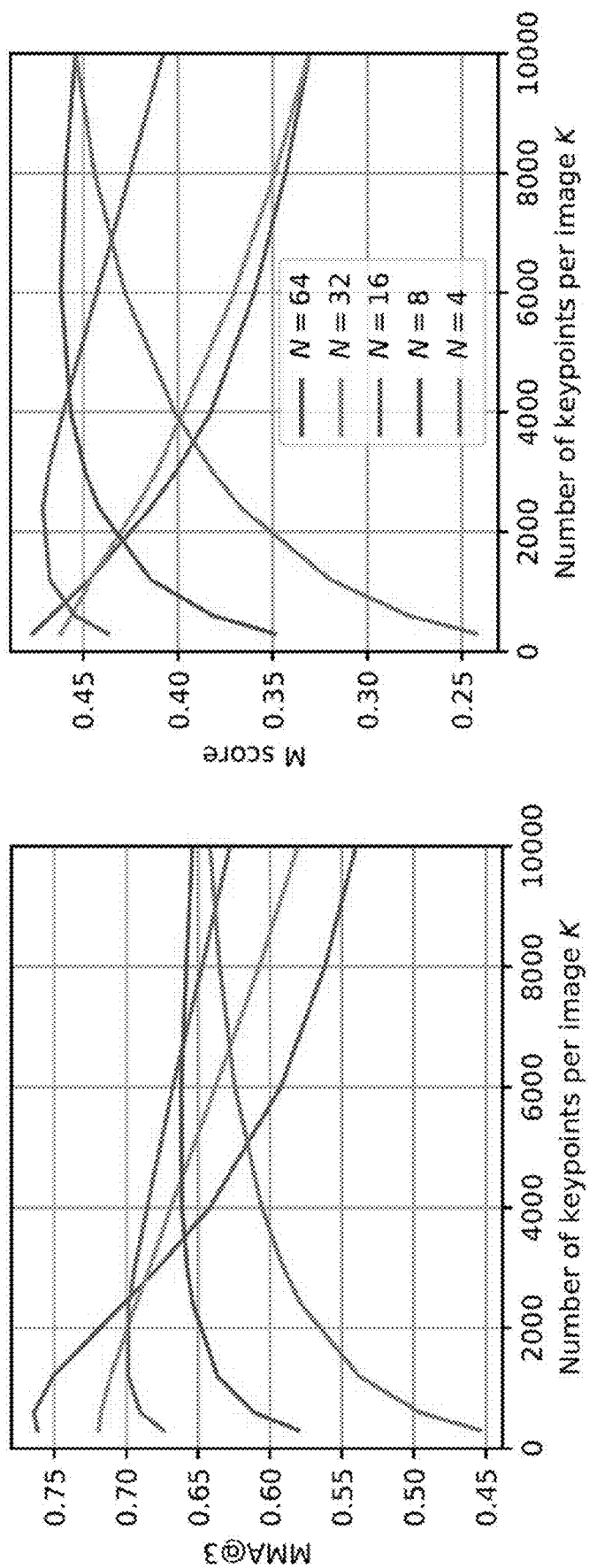
FIG. 6 includes example graphs of scores for different patch sizes as a function of the number of retained keypoints per image.

FIG. 6 includes example graphs of MMA (at a 3 px error threshold) and M-Score for different patch sizes of N as a function of the number of retained keypoints K per image. Description and detection modules trained with large N values outperformed description and detection modules trained using smaller N values when the number of retained keypoints is low since the keypoints have higher quality. When the number of keypoints retained is larger, poor local maxima start to be selected and matching performance decreases. There is a trade-off between the number of keypoints and matching performance. N=16 and 5000 retained keypoints may provide better results given the trade-off.

Below is an example table where the top row includes the M-score and MMA for the example where the description and detection module does not determine a repeatability mapping but does determine a reliability mapping. The middle row includes the M-score and MMA for the example where the description and detection module does not determine a reliability mapping but does determine a repeatability mapping. The bottom row includes the M-score and MMA for the example where the description and detection module determines both a reliability mapping and a repeatability mapping.

| reliability | repeatability | M-score | MMA@3 |
|---|---|---|---|
| ✓ |   | 0.304 | 0.512 |
|   | ✓ | 0.436 | 0.680 |
| ✓ | ✓ | 0.461 | 0.686 |

In view of the above, repeatability and reliability can be predicted separately to help jointly determine detections and descriptions. The table above illustrates that, without repeatability, performance decreases both in terms of MMA and M-score. This shows that repeatability is not well correlated with descriptor reliability. When training without descriptor reliability, M-score decreases by approximately 3% and the MMA decreases by approximately 0.6%.

Figure 7:
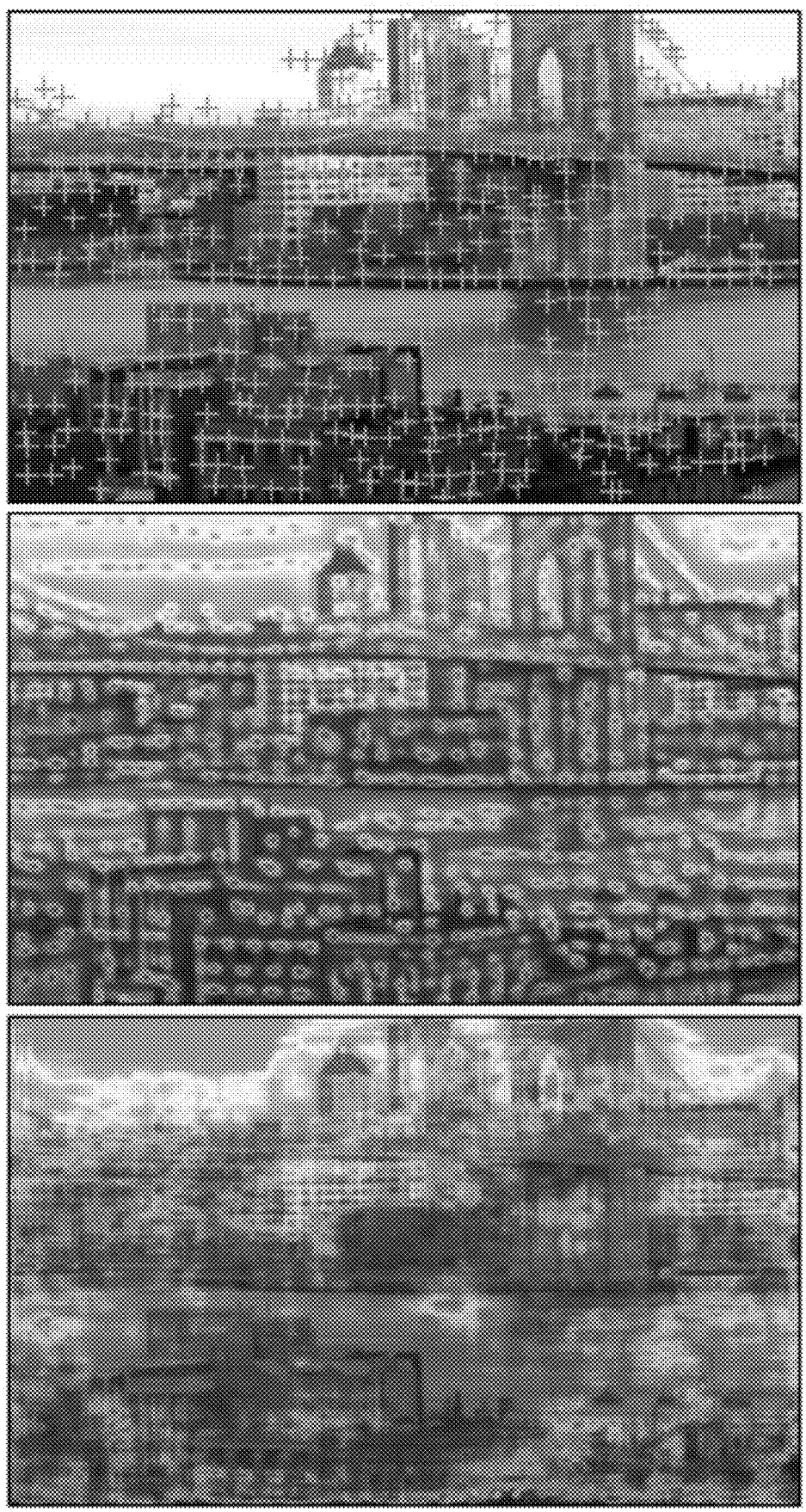
FIG. 7 an example input image and repeatability and reliability mappings generated based on the input image.

FIG. 7 includes an example input image and repeatability mappings generated based on the input image. The top image is an input image with overlaid green crosses. The middle image includes a repeatability mapping generated based on the input image by the description and detection module 116. The bottom image includes a reliability mapping generated by the description and detection module 116 based on the input image. The retained keypoints of the keypoint list (having the highest scores) are identified by crosses on the top image in FIG. 7. As illustrated, the description and detection module 116 accurately determined that the sky region has little matching and should not be identified in the keypoint list. Also, the description and detection module 116 rejected complex patterns, such as 1D patterns (e.g., under the bridge) and grid patterns (e.g., windows of buildings). The scores in those regions were low and therefore not retained in the keypoint list.

While the example of use of the description and detection module 116 is provided above with respect to the navigating robot 100, the description and detection module 116 may be used in other contexts. For example, the description and detection module 116 may be used in visual localization where camera position is estimated within a given environment using an image. Robust local feature matching may help enable visual localization in real world environments where there are challenges, such as day-night transitions and significant viewpoint differences between training, testing, and the real environment. The size of N and the number of keypoints used in the keypoint list, however, may vary. For example, for visual localization, a greater number of keypoints per image may be used. The greater number of keypoints may increase a likelihood of having at least a few keypoints correctly matched despite occlusions, viewpoint changes, illumination changes, etc., which in turn improves localization accuracy. For example only, 10,000 keypoints may be retained in visual localization, while a patch size of N=8 (8×8 pixels) may be used. For visual localization, the description and detection module 116 may also be varied. For example, the description and detection module 116 may include double the number of weights of the convolution layers. This may provide better performance in visual localization.

Figure 8:
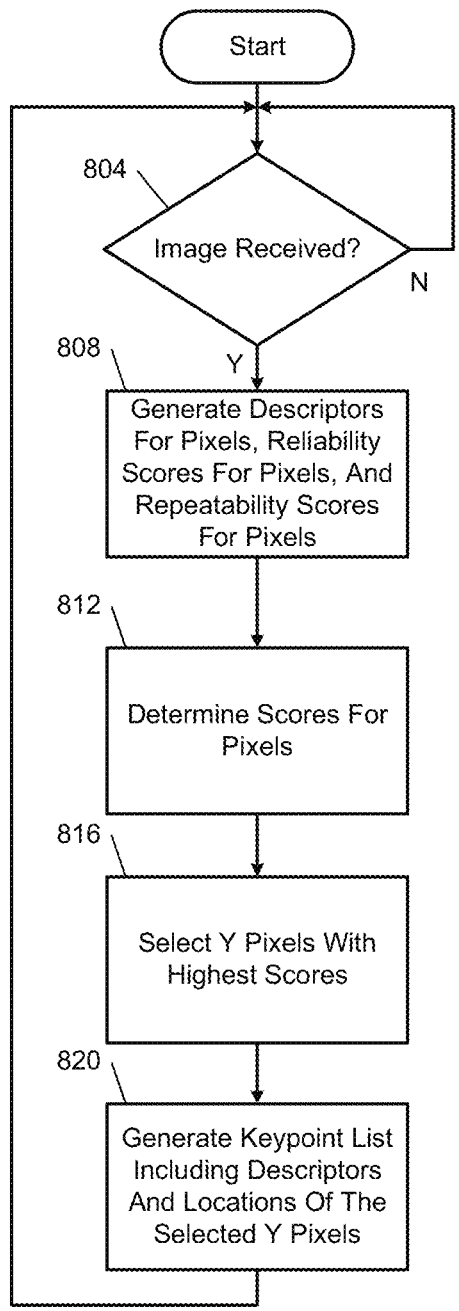
FIG. 8 includes a flowchart depicting an example method of generating a keypoint list for an image.

FIG. 8 is a flowchart depicting an example method of jointly (concurrently) generating descriptors, reliability mappings, and repeatability mappings for input images. Control begins with 804 where the description and detection module 116 determines whether an image has been received. If 804 is true, control continues with 808. If 804 is false, control remains at 804.

At 808, the description and detection module 116 generates the descriptors for each pixel in the received image. Also at 808, the description and detection module 116 generates the reliability scores for the pixels and the repeatability scores for the pixels. The reliability scores for the pixels and the repeatability scores for the pixels make up the reliability mapping and the repeatability mapping, respectively.

At 812, the description and detection module 116 determines the scores for the pixels, respectively. The description and detection module 116 determines the scores for the pixels based on the reliability scores of the pixels and the repeatability scores of the pixels, respectively. For example, the description and detection module 116 determines the score for a pixel based on the reliability score for that pixel and the repeatability score of that pixel. The description and detection module 116 may determine the scores using one of an equation and a lookup table that relates reliability scores and repeatability scores to scores. For example, the description and detection module 116 may set the score of a pixel based on or equal to the reliability score of the pixel multiplied by the repeatability score of the pixel.

At 816, the description and detection module 116 selects the Y pixels of the image that have the highest Y scores, respectively. Y is an integer greater than one and may be, for example, 1,000, 5,000, 10,000, or another suitable number. At 820, the description and detection module 820 generates the keypoint list for the image based on the Y pixels. This includes the pixel location (e.g., i, j) of the selected Y pixels and the descriptors of the selected Y pixels, respectively. One or more actions may be taken based on the keypoint list. In the example of visual localization, a visual localization module (e.g., of the navigating robot 100) may determine a location of the camera in the environment based on the information in the keypoint list. In the example of visual navigation, the control module 112 may actuate one or more of the propulsion devices 108 based on the information in the keypoint list.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for detecting and describing keypoints in images, the system comprising:
    a camera configured to capture an image including a plurality of pixels;
    a fully convolutional network configured to jointly and concurrently:
        generate descriptors for each of the pixels, respectively;
        generate reliability scores for each of the pixels, respectively; and
        generate repeatability scores for each of the pixels, respectively;
    a scoring module configured to generate scores for the pixels, respectively, based on the reliability scores and the repeatability scores of the pixels, respectively; and
    a keypoint list module configured to:
        select X of the pixels having the X highest scores, wherein X is an integer greater than 1; and
        generate a keypoint list including:
            locations of the selected X pixels; and
            the descriptors of the selected X pixels.

2. The system of claim 1 wherein the scoring module sets the score for one of the pixels equal to the one of the reliability scores for the one of the pixels multiplied by the repeatability scores for the one of the pixels.

3. The system of claim 2 wherein the fully convolutional network is configured to limit the reliability scores and the repeatability scores to between 0 and 1, inclusive.

4. The system of claim 1 wherein X is an integer greater than or equal to 1,000.

5. The system of claim 1 wherein the fully convolutional network includes:
    a first convolutional layer configured to receive the image and generate a first output based on the image;
    a second convolutional layer configured to receive the first output and generate a second output based on the first output;
    a third convolutional layer configured to receive the second output and generate a third output based on the second output;
    a fourth convolutional layer configured to receive the third output and generate a fourth output based on the third output;
    a fifth convolutional layer configured to receive the fourth output and generate a fifth output based on the fourth output;
    a sixth convolutional layer configured to receive the fifth output and generate a sixth output based on the fifth output;
    a seventh convolutional layer configured to receive the sixth output and, based on the sixth output, generate a seventh output and an eighth output,
    wherein the fully convolutional network is configured to:
        based on the seventh output, generate the descriptors for each of the pixels, respectively;
        based on the eighth output, generate the reliability scores for each of the pixels, respectively; and
        based on the eighth output, generate the repeatability scores for each of the pixels, respectively.

6. The system of claim 5 wherein the first convolutional layer includes a 3×3 convolutional layer.

7. The system of claim 5 wherein the second convolutional layer includes a 3×3 convolutional layer with at least one dilation layer.

8. The system of claim 5 wherein the third convolutional layer 2 includes a 3×3 convolutional layer.

9. The system of claim 5 wherein the fourth convolutional layer includes a 3×3 convolutional layer with at least one dilation layer.

10. The system of claim 5 wherein the fifth convolutional layer includes a 2×2 convolutional layer.

11. The system of claim 5 wherein the sixth convolutional layer includes a 2×2 convolutional layer.

12. The system of claim 5 wherein the seventh convolutional layer includes a 2×2 convolutional layer.

13. The system of claim 5 further comprising a normalization module configured to receive the seventh output and normalize the seventh output to produce a ninth output.

14. The system of claim 13 wherein the normalization module is configured to normalize the seventh output using l2 normalization (L2-Norm).

15. The system of claim 13 further comprising a descriptor module configured to, based on the ninth output, generate the descriptors for each of the pixels, respectively,
    wherein each descriptor of a pixel includes a mathematical representation of a keypoint within that pixel.

16. The system of claim 5 further comprising:

a squaring module configured to elementwise square the eighth output to produce a tenth output;

an eighth convolutional layer configured to receive the tenth output and, based on the tenth output, generate eleventh and twelfth outputs;

a ninth convolutional layer configured to receive the eleventh output and generate a thirteenth output based on the eleventh output;

a tenth convolutional layer configured to generate the reliability scores based on the thirteenth output;

an eleventh convolutional layer configured to receive the twelfth output and generate a fourteenth output based on the twelfth output; and a twelfth convolutional layer configured to generate the repeatability scores based on the fourteenth output.

17. The system of claim 16 wherein the eighth convolutional layer includes a 3×3 convolutional layer.

18. The system of claim 17 wherein the eighth convolutional layer further includes at least one dilation layer.

19. The system of claim 16 wherein the ninth convolutional layer includes one of a 1×1 convolutional layer and a 3×3 convolutional layer, or another suitable type of layer.

20. The system of claim 16 wherein the tenth convolutional layer includes one of a 1×1 convolutional layer and a 3×3 convolutional layer.

21. The system of claim 16 wherein the eleventh convolutional layer includes one of a 1×1 convolutional layer and a 3×3 convolutional layer.

22. The system of claim 16 wherein the twelfth convolutional layer includes one of a 1×1 convolutional layer and a 3×3 convolutional layer.

23. The system of claim 1 further comprising a training module configured to train the fully convolutional network by maximizing an Average Precision (AP) using a training dataset.

24. A method for detecting and describing keypoints in images, the method comprising:

receiving an image including a plurality of pixels; and jointly and concurrently:

generating descriptors for each of the pixels, respectively;

generating reliability scores for each of the pixels, respectively; and generating repeatability scores for each of the pixels, respectively;

generating scores for the pixels, respectively, based on the reliability scores and the repeatability scores of the pixels, respectively;

selecting X of the pixels having the X highest scores, wherein X is an integer greater than 1; and generating a keypoint list including:

locations of the selected X pixels; and the descriptors of the selected X pixels.

25. The method of claim 24 further comprising identifying an object in the image based on the locations and the descriptors.

26. A system for detecting and describing keypoints in images, the system comprising:

a means for receiving an image including a plurality of pixels and jointly and concurrently:

generating descriptors for each of the pixels, respectively;

generating reliability scores for each of the pixels, respectively; and generating repeatability scores for each of the pixels, respectively;

a means for generating scores for the pixels, respectively, based on the reliability scores and the repeatability scores of the pixels, respectively; and a means for:

selecting X of the pixels having the X highest scores, wherein X is an integer greater than 1; and generating a keypoint list including:

locations of the selected X pixels; and the descriptors of the selected X pixels.

\* \* \* \* \*